(12) United States Patent
Azema

(10) Patent No.: US 6,228,523 B1
(45) Date of Patent: May 8, 2001

(54) CURRENT PATH CUT-OFF COMPONENT OF CELL

(75) Inventor: Tadamitsu Azema, Miyagi-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/293,385

(22) Filed: Apr. 15, 1999

(30) Foreign Application Priority Data

Apr. 23, 1998 (JP) .................................................. 10-113100

(51) Int. Cl.[7] .................................................... H01M 2/34
(52) U.S. Cl. .................................. 429/61; 429/7; 429/90; 429/57
(58) Field of Search .................................. 429/61, 57, 90, 429/7

(56) References Cited

U.S. PATENT DOCUMENTS 4,943,497   7/1990   Oishi et al. .
5,609,972 * 3/1997   Kaschmitter et al. ............. 429/61 X

* cited by examiner

Primary Examiner—John S. Maples
(74) Attorney, Agent, or Firm—Brinks Hofer Gilson & Lione

(57) ABSTRACT

A current path cut-off component of a cell is to be provided which is smaller in the number of parts used than in conventional like components and which is superior in assembling performance. In the current path cut-off component of a cell according to the present invention, a current path is formed between a cell lid and a power generating element (not shown) disposed in the interior of the cell, through a diaphragm portion and a lead, the diaphragm portion displaces itself upon an increase in internal pressure of a cell case above a predetermined value, and this displacement of the diaphragm portion causes the diaphragm portion and the lead to be separated from each other to cut off the current path.

6 Claims, 4 Drawing Sheets

CURRENT PATH CUT-OFF COMPONENT OF CELL

BACKGROUND OF THE INVENTION

1. Field of the Invention

The present invention relates to a current path cut-off component of a cell and more particularly to a current path cut-off device of a cell to be used for ensuring safety against an increase in internal pressure of a cell case.

2. Description of the Prior Art

For example, a rechargeable lithium ion secondary cell with an organic solvent type electrolyte poured and sealed into the interior of a cell case has heretofore been used widely as a power source of portable devices such as portable telephones and personal computers.

However, when such a cell is recharged, if the recharging is performed to an excessive degree or with an electric current larger than a predetermined current, a problem will occur in the cell, with evolution of gas, increase in internal pressure and temperature of the cell, swelling of the cell, and eventual cracking of the cell case, resulting in that the electrolyte present within the cell case oozes to the exterior and may exert adverse effect to the device in which the cell is incorporated. Even if such a problem in the cell does not lead to such a result, if the use of the cell is continued under the aforesaid occurrence of such a problem, the swelling of the cell will become more and more conspicuous, which may cause bursting of the cell. Therefore, it has been necessary to immediately stop the use of the cell upon occurrence of such a problem.

In a conventional current path cut-off component of a cell, as shown in FIGS. 8 and 9, a cell lid 3 and an upwardly displaceable actuator 4 are mounted through a gasket 2 to a case 1 of a cell which is, for example, a circular cell. The cell lid 3 is mounted by caulking for example so as to hermetically seal the interior of the cell case 1, and the actuator 4 is disposed below the cell lid 3.

Vent holes 3a are formed in the cell lid 3 so that upon displacement of the underlying actuator 4 the air present inside the cell lid can escape to the exterior through the vent holes 3a.

The actuator 4 has a disk-like safety valve portion 4a formed, for example, by drawing with use of a press. The safety valve portion 4a has a central protuberance 4b which projects downward in the figure, with radial grooves 4c being formed around the protuberance 4b.

An insulating board 5 is disposed on the underside of the actuator 4. A hole 5a for insertion therethrough of the protuberance 4a of the safety valve portion 4a and a vent hole 5b are formed through the insulating board 5.

Underlying the insulating board 5 is a lead fixing member 6, in which are formed a hole 6a communicating with the hole 5a of the insulating board 5 and a vent hole 6b communicating with the vent hole 5b of the insulating board 5.

The protuberance 4b of the safety valve portion 4a is inserted into the holes 5a and 6a of the insulating board 5 and the lead fixing member 6, respectively, and a lead 7 formed by a thin metallic plate is bonded to the tip of the protuberance 4b.

The lead 7 is bonded to the tip of the protuberance 4b, the actuator 4 and the lead 7 are in electric conduction with each other. The opposite end of the lead 7 is connected to a power generating element 8 located at a lower position in the figure, with a current path being formed between the power generating element 8 and the cell lid 3.

In the event of an increase in internal pressure of the cell case 1 due to a problem in the interior of the cell, a gas of an increased pressure flows like arrow A in FIG. 9 through the vent holes 5b and 6b and exerts an upward force on the back side of the safety vale portion 4a.

With this force, the safety valve portion 4a is raised up and the lead 7 is ruptured at its portion bonded to the protuberance 4b, whereby the current path of the cell is cut off.

As a result, the increase in internal pressure of the cell case 1 is suppressed to prevent bursting of the cell.

As portable devices become smaller in size, the recent cells using such a current path cut-off component are encountering a strong demand for the reduction of size. Such a demand is becoming more and more strong also for the conventional cells.

However, in such a conventional current path cut-off component as referred to above, unless the size of the safety valve portion 4a is made large, an increased internal pressure of the cell cannot be detected with a high accuracy. This point has been an obstacle to the reduction of size.

Moreover, in the conventional current path cut-off component of a cell, since the cell lid 3 and the actuator 4 are formed as separate members, the number of parts used becomes larger and the cell assembling operation becomes complicated.

SUMMARY OF THE INVENTION

It is an object of the present invention to solve the above-mentioned problems and provide a current path cut-off component of a cell capable of being reduced in both the size and the number of parts used.

According to the first embodiment adopted by the present invention for solving the above-mentioned problems, there is provided a current path cut-off component of a cell, comprising a cell case containing a power generating element, a cell lid for closing the cell case in a hermetically sealed state, a diaphragm portion formed by swelling a thin-walled portion of the cell lid inwards of the cell case, a lead connected to the power generating element and bonded to a substantially central part of the diaphragm portion, and a fixing member for fixing the lead in the interior of the cell case in the bonded state of the lead to the diaphragm portion, wherein a current path is formed between the cell lid and the power generating element through the diaphragm portion and the lead, the diaphragm portion displaces itself upon an increase in internal pressure of the cell case above a predetermined value, and this displacement of the diaphragm portion causes the diaphragm portion and the lead to be disconnected from each other to cut off the current path.

According to the second embodiment adopted by the invention for solving the foregoing problems, in combination with the above first means, the diaphragm portion is formed thick at its central part and thereabouts to which the lead is bonded and is formed thin at its surrounding portion adjacent thereto.

According to the third embodiment adopted by the invention for solving the foregoing problems, in combination with the above first means, the lead is formed thinner at its portion bonded to the diaphragm portion than at the other portion thereof.

According to the fourth embodiment adopted by the invention for solving the foregoing problems, in combination with any of the above first to third means, the diaphragm portion and the lead are bonded together by welding.

DETAILED DESCRIPTION OF A PREFERRED EMBODIMENT

Figure 1:
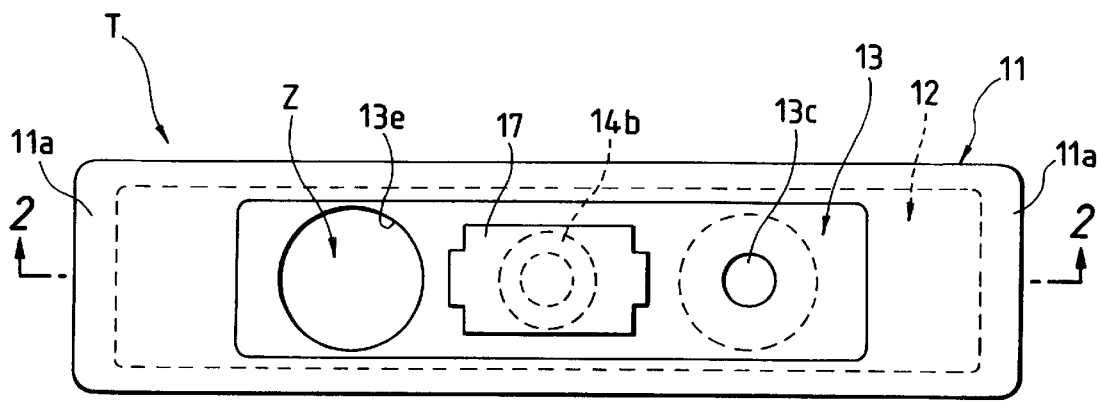
FIG. 1 is a top view of a current path cut-off component of a cell according to the present invention.
Figure 2:
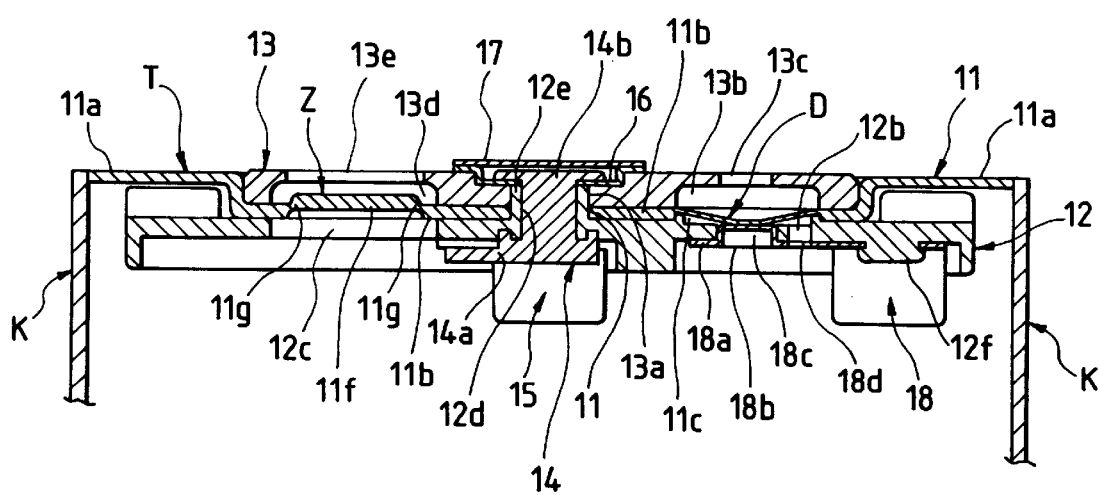
FIG. 2 is a sectional view taken on line 2—2 in FIG. 1, with the current path cut-off component mounted to a cell case.
Figure 3:
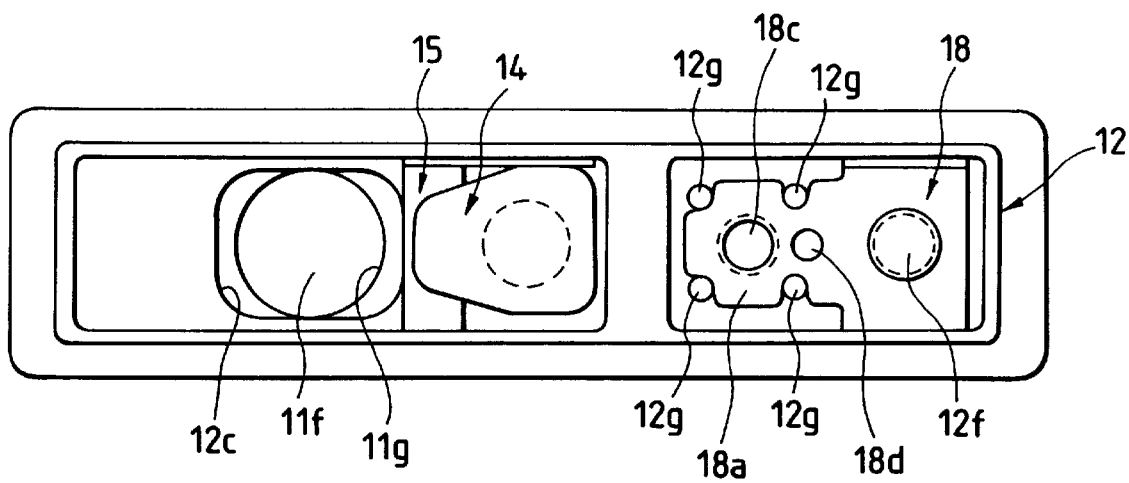
FIG. 3 is a bottom view of the current path cut-off component.
Figure 4:
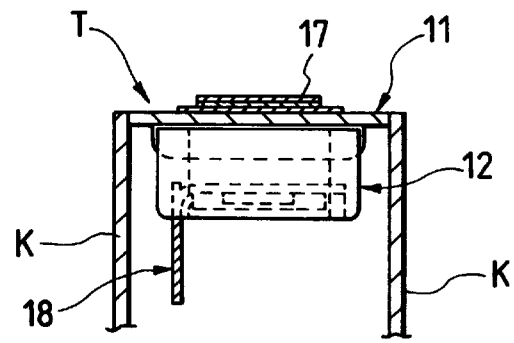
FIG. 4 is a side view thereof.
Figure 5:
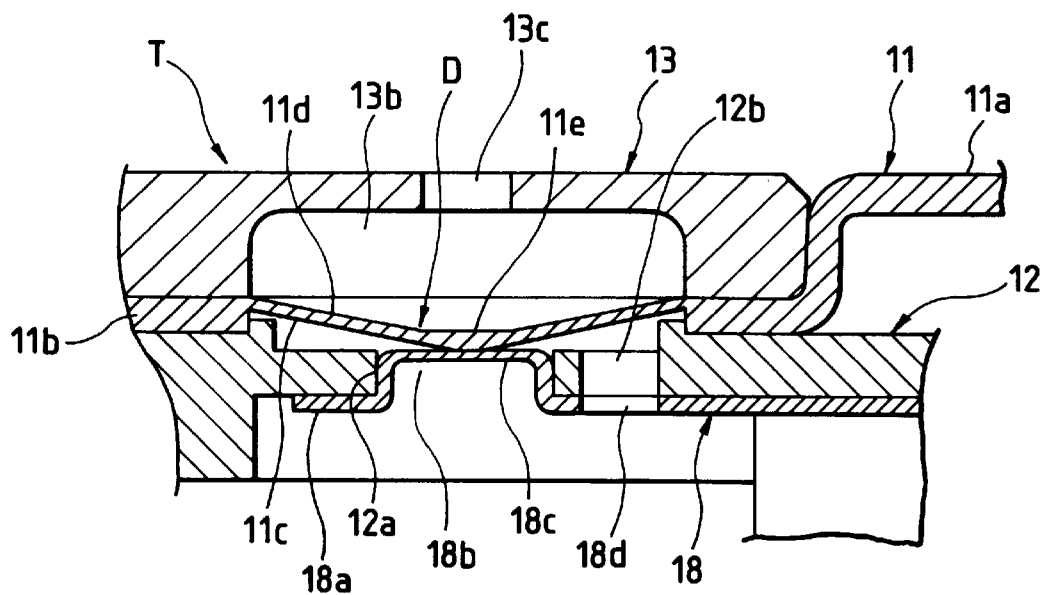
FIG. 5 is an enlarged sectional view of a principal portion thereof.
Figure 6:
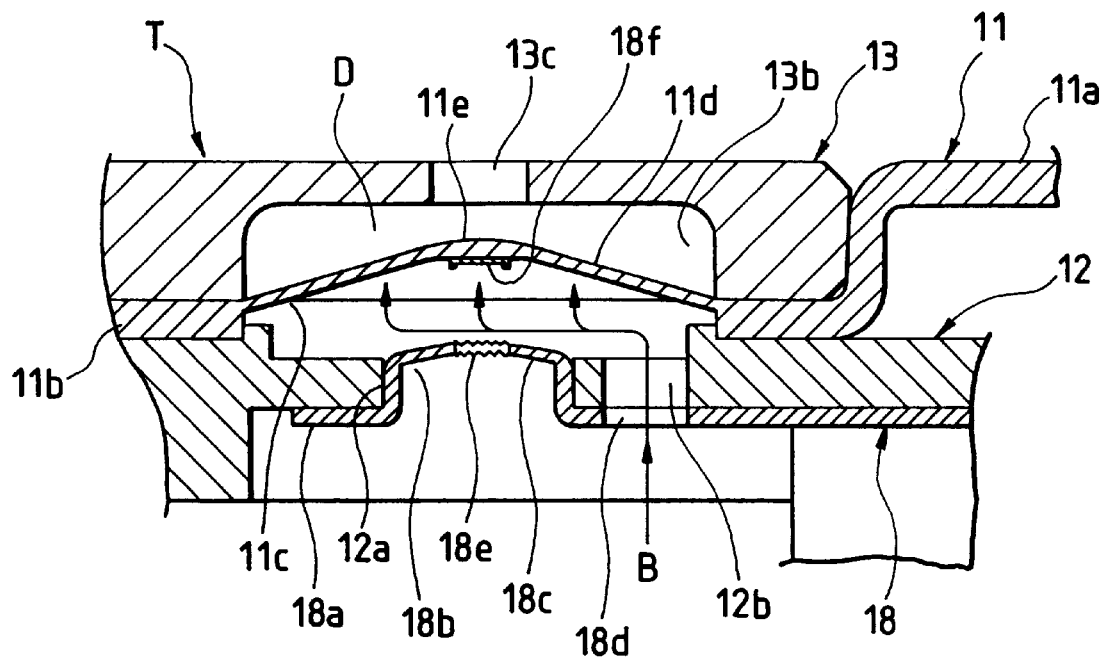
FIG. 6 is an enlarged sectional view of the principal portion, explaining an operation of the current path cut-off component.
Figure 7:
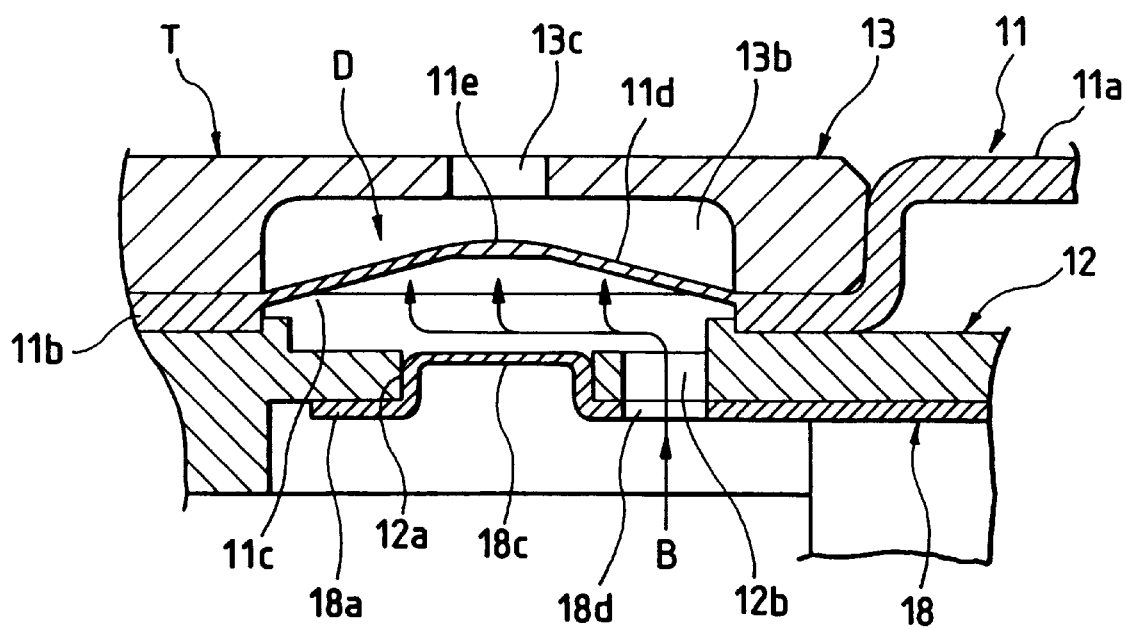
FIG. 7 is an enlarged sectional view of the principal portion, explaining another operation of the current path cut-off component.
Figure 8:
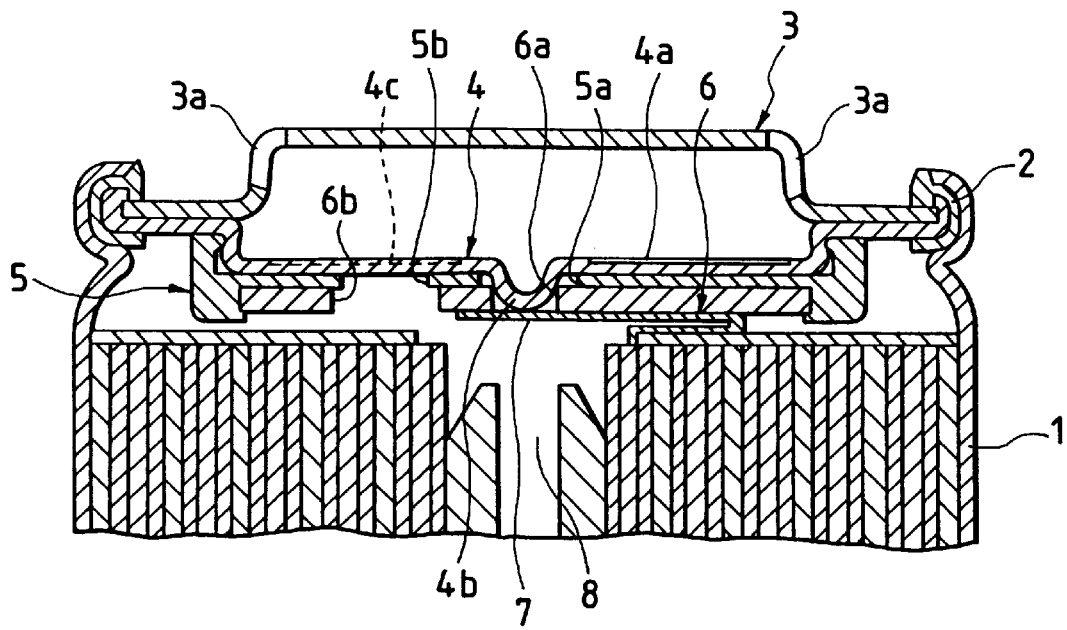
FIG. 8 is a sectional view of a principal portion of a conventional current path cut-off component in a cell.
Figure 9:
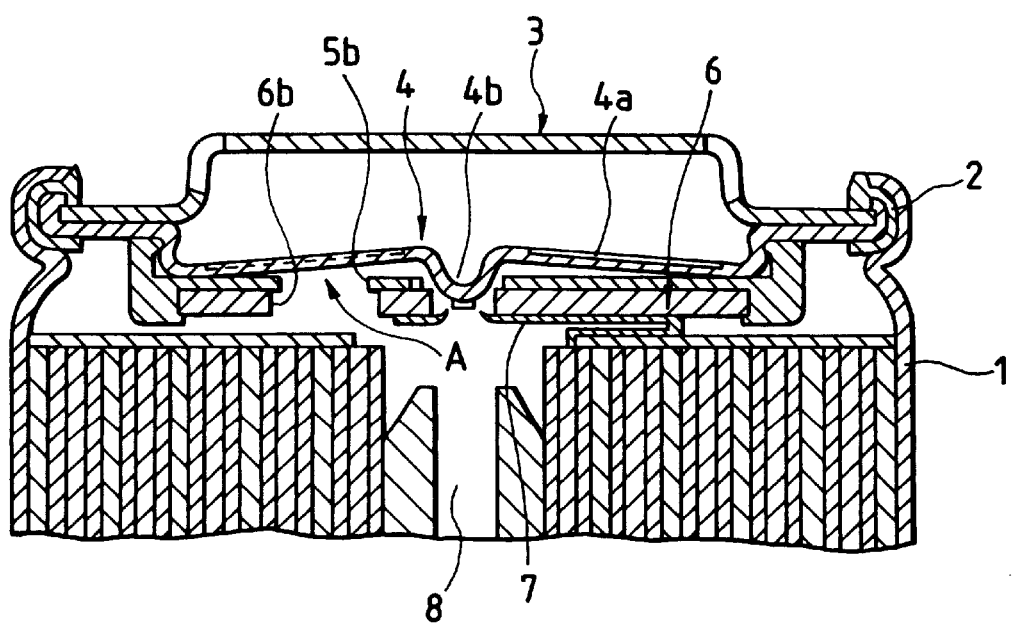
FIG. 9 is a view similar to FIG. 8, explaining an operation of the conventional current path cut-off component.

An embodiment of the present invention will be described hereinunder with reference to the accompanying drawings, in which FIG. 1 is a top view of a current path cut-off component of a cell embodying the present invention, FIG. 2 is a sectional view taken on line 2—2 in FIG. 1, with the current path cut-off component mounted to a cell case, FIG. 3 is a bottom view of the current path cut-off component, FIG. 4 is a side view thereof, FIG. 5 is an enlarged sectional view of a principal portion of the current path cut-off component, FIG. 6 is an enlarged sectional view of the principal portion, explaining an operation of the current path cut-off component, and FIG. 7 is an enlarged sectional view of the principal portion, explaining another operation of the current path cut-off component.

It is here assumed that the current path cut-off component, indicated at T, is used in a rectangular cell. A cell lid 11 is disposed so as to close a cell case K in a hermetically sealed state, the cell case K containing a power generating element (not shown). The cell lid 11 is sandwiched in between a fixing member 12 which underlies the cell lid and a presser member 13 which overlies the cell lid, with a central rivet 14 being caulked to unite the cell lid 11, fixing member 12 and presser member 13.

Simultaneously with caulking of the rivet 14, a conductive washer 16 and a positive electrode terminal 15 are secured to the rivet at upper and lower positions, respectively. Above the rivet 14 is disposed an outer positive electrode 17, which is bonded to the conductive washer 16 and thereby turns conductive. A negative electrode terminal 18 having a lead 18a is secured to one end side of the fixing member 12 by caulking for example.

Above-mentioned cell lid 11 in the current path cut-off component T is constituted by an electrically conductive metallic plate such as a stainless steel plate. As shown in FIGS. 1 to 5, an external form of the cell lid 11 is generally rectangular, with a flange portion 11a being formed along the outer periphery, and the portion inside the flange portion 11a is projected downward by drawing for example to form a flat bottom plate 11b.

A diaphragm portion D and a safety vale portion Z are formed on the right and left sides, respectively, in FIG. 2 as portions of the bottom plate 11b of the cell lid 11.

In the diaphragm portion D, as shown in FIG. 5, an annular recess 11c and a thin-walled portion 11d are formed, for example, by grinding from the lower surface side of the bottom plate 11b.

By press working for example, the thin-walled portion 11d is expanded inwards of the cell case K and is thereby formed in a bowl shape. The thus-expanded thin-walled portion 11d is centrally formed with a thick-walled portion 11e thicker than the surrounding thin-walled portion 11d.

That is, the diaphragm portion D is composed of the central thick-walled portion 11e and the surrounding thin-walled portion 11d. The thick-walled portion 11e is displaceable vertically with the base part of the thin-walled portion 11d as fulcrum.

The safety valve portion Z comprises a flat, thick-walled projecting portion 11f which is annular in external shape and which projects upward in FIG. 2, and a connecting portion 11g formed by thinning the base part of the projecting portion 11f.

The fixing member 12, which is formed of an insulating material in a rectangular shape smaller than the external shape of the cell lid 11, is attached to the lower surface of the bottom plate 11b of the cell lid 11. The fixing member 12 has a hole 12a and a first vent hole 12b. The hole 12a is formed through the fixing member in a position under the central thick-walled portion 11e of the diaphragm portion D, and the first vent hole 12b is formed through the fixing member in a position close to the hole 12a. Further, a second vent hole 12c, which is a little larger than the safety valve portion Z, is formed through the fixing member 12 in a position under the safety valve portion Z.

Centrally of the fixing member 12 is formed a cylindrical portion 12e in an upwardly projecting state, the cylindrical portion 12e having a central hole 12d for insertion therein of a rivet 13 which will be described later.

A downwardly projecting caulking portion 12f is formed on the lower surface of the fixing member 12 at a right-hand position in FIG. 2, and such four lugs 12g as shown in FIG. 3 are formed around the hole 12a to effect positioning for the lead 18a of the negative electrode terminal 18 which will be described later.

The presser member 13 is disposed on the bottom plate 11b of the cell lid 11 to press down the cell lid 11 against the fixing member 12. The presser member 13 is formed of an insulating material and has a central hole 13a through which the cylindrical portion 12e of the fixing member 12 is inserted. The presser member 13 also has a first recess 13b formed above the diaphragm portion D and a first vent hole 13c formed through the first recess 13b.

Above the safety valve portion Z, the presser member 13 is further provided with a second recess 13d in which the safety valve portion Z is positioned and a second vent hole 13e formed through the second recess 13d.

The rivet 14, which is formed using, say, aluminum, is inserted through the central hole 12d of the fixing member 12. The rivet 14 has a head portion 14a formed at a lower position and a tip portion 14b formed at an upper position and projecting from the cylindrical portion 12e.

A generally L-bent positive electrode terminal 15 is held between the head portion 14a of the rivet 14 and the fixing member 12, and the conductive washer 16 is held between the tip portion 14b after caulked and crushed and the presser member 13.

Above the caulked tip portion 14b of the rivet 14, the outer positive electrode 17 is bonded to both end portions of the conductive washer 16 by, for example, spot welding. The outer positive electrode 17 is formed by a steel plate or the like and the surface thereof is plated with nickel for example. The outer positive electrode 17 and the positive electrode terminal 15 are in electric conduction with each other through the rivet 14.

The negative electrode terminal 18, which is bent in a generally L shape, is attached to the caulking portion 12f of the fixing member 12. The lead 18a of the negative electrode terminal 18 is attached to the lower surface of the fixing member 12 and it has a circular, upwardly projecting portion 18b formed by drawing for example. The projecting portion 18b is fitted in the hole 12a of the fixing member 12.

The projecting portion 18b has a flat upper surface 18c, which is smaller in wall thickness than the other surrounding portion.

The upper surface 18c of the projecting portion 18b fitted in the hole 12a is bonded centrally to the thick-walled portion 11e of the diaphragm portion D by spot welding for example. In this bonded state to the diaphragm portion D, the lead 18a is fixed in the interior of the cell case K by the caulking portion 12f of the fixing member 12. Further, the lead 18 is established its position and inhibited its movement by the four lugs 12g formed around the hole 12a of the fixing member 12.

In the current path cut-off component T constructed as above, as shown in FIG. 2, the flange portion 11a as an outer peripheral portion of the cell lid 11 is secured to the cell case K containing a power generating element (not shown) by welding for example, in such a manner as to hermetically seal the interior of the cell case.

In the cell provided with the current path cut-off component T, a current path is formed between the cell lid 11 and a negative electrode (not shown) of the power generating element disposed in the interior of the cell, through the diaphragm portion D and the lead 18a.

According to the current path cut-off component T, in the event a trouble should occur in the interior of the cell, with consequent increase in internal pressure of the cell, as shown in FIG. 6, a rising gas passes through a vent hole 18d of the lead 18a and the first vent hole 12b of the fixing member 12 and gets into the recess 11c, like the arrow B, so that an upward force is exerted on the diaphragm portion D.

When the internal pressure of the cell increases above a predetermined value, the thin-walled upper surface 18c of the lead 18a is broken from the welded portion thereof, with the result that the diaphragm portion D is displaced upward, or inverted, at a stretch. Upon this inversion of the diaphragm portion D, the diaphragm portion D and the lead 18a are separated from each other, whereby the current path formed between the cell lid 11 and a negative electrode (not shown) of the power generating element disposed in the interior of the cell can be separated from each other.

At this time, in the upper surface 18c of the lead 18a is formed a broken hole 18e by the inversion of the diaphragm portion D, and a broken piece 18f of the lead 18a remains bonded to the diaphragm D.

The method for cutting off the current path between the cell lid 11 and the negative electrode (not shown) of the power generating element in the interior of the cell is not limited to rupture of the upper surface 18c of the lead 18a, but the thick-walled portion 11e of the disphragm portion D may be separated from the upper surface 18c of the lead 18a by adjusting the strength of spot welding, as shown in FIG. 7.

Or the diaphragm thick-walled portion 11e may be ruptured from the thin-walled portion 11d around the thick-walled portion 11e while the thick-walled portion 11e remains bonded to the lead upper surface 18c, (not shown).

If the internal pressure of the cell continues to further rise without letup even after cut-off of the current path between the cell lid 11 and the power generating element (not shown) in the interior of the cell, the further increased internal pressure of the cell will be exerted on the projecting portion 11f of the safety valve portion Z and acts to push up the projecting portion, resulting in rupture of the connecting portion 11g which is formed thin.

A high-pressure gas present in the interior of the cell will be discharged to the exterior from the ruptured part of the connecting portion 11g, whereby the cell can be prevented from bursting.

In the current path cut-off component of a cell according to the present invention, a current path is formed between the cell lid and the power generating element disposed within the cell, through a diaphragm portion formed thin as part of the cell lid and further through a lead bonded to the diaphragm portion, and the diaphragm portion displaces itself upon an increase in internal pressure of the cell case above a predetermined value, whereby the diaphragm portion and the lead are separated from each other to cut off the current path. By thus cutting off the current path it is made possible to stop the flow of electric current in the interior of the cell and prevent a further increase of the internal pressure. Thus, explosion or the like of the cell can be prevented.

Besides, since the diaphragm portion is formed directly as part of the cell lid, it is possible to reduce the number of parts used and provide a current path cut-off component of a cell superior in assembling performance.

Moreover, since the diaphragm portion is formed directly as part of the cell lid, it is possible to provide a current path cut-off component of a cell superior in sensitivity even if the diaphragm portion is small.

Further, since the diaphragm portion is formed thick at its central area to which the lead is bonded and is formed thin at the surrounding portion, it is possible to prevent the diaphragm portion from being deformed or cut thermally at its central bonding part when the lead is bonded thereto.

Further, when an increased internal pressure of the cell is applied to the diaphragm portion, the diaphragm portion can be ruptured from its thin-walled portion and the gas present in the interior of the cell and which has become high in pressure can be allowed to escape through the ruptured portion. Thus, not only the current path in the cell is cut-off, but also the diaphragm portion also functions as a safety valve. That is, it is possible to provide a less expensive current path cut-off component.

Further, the lead is formed thinner at its portion to be bonded to the diaphragm portion than at its other portion, so upon displacement of the diaphragm portion after bonding the lead to the diaphragm portion, the lead can easily be broken at the thin-walled portion to cut off the current path.

Further, since the diaphragm portion and the lead can be welded together by a single spot welding operation, the current path cut-off component of a cell according to the present invention is superior in assembling performance.

What is claimed is:

1. A current path cut-off component of a cell, comprising:
   a cell case containing a power generating element;
   a cell lid for closing said cell case in a hermetically sealed state;
   a diaphragm portion formed by swelling a thin-walled portion of said cell lid inwards of said cell case,;

a lead connected to said power generating element and bonded to a substantially central part of said diaphragm portion; and a fixing member for fixing said lead in the interior of said cell case in the bonded state of the lead to said diaphragm portion, wherein a current path is formed between said cell lid and said power generating element through said diaphragm portion and said lead, the diaphragm portion displaces itself upon an increase in internal pressure of said cell case above a predetermined value, and said displacement of the diaphragm portion causes the diaphragm portion and the lead to be disconnected from each other to cut off said current path.

2. A current path cut-off component of a cell according to claim 1, wherein said diaphragm portion is formed thick at its central part and thereabouts to which the lead is bonded and is formed thin at its surrounding portion adjacent thereto.

3. A current path cut-off component of a cell according to claim 1, wherein said lead is formed thinner at its portion bonded to said diaphragm portion than at an other portion thereof.

4. A current path cut-off component of a cell according to claim 1, wherein said diaphragm portion and said lead are bonded together by welding.

5. A current path cut-off component of a cell according to claim 2, wherein said diaphragm portion and said lead are bonded together by welding.

6. A current path cut-off component of a cell according to claim 3, wherein said diaphragm portion and said lead are bonded together by welding.

* * * * *

UNITED STATES PATENT AND TRADEMARK OFFICE
CERTIFICATE OF CORRECTION

PATENT NO. : 6,228,523 B1
DATED : May 8, 2001
INVENTOR(S) : Tadamitsu Azema

It is certified that error appears in the above-identified patent and that said Letters Patent is hereby corrected as shown below:

Claim 1,
Line 6, change "cell case ,;" to -- cell case; --.

Signed and Sealed this

Twenty-sixth Day of March, 2002

*Attest:*

*Attesting Officer*

JAMES E. ROGAN
*Director of the United States Patent and Trademark Office*